(12) United States Patent
Carman

(10) Patent No.: US 10,259,610 B2
(45) Date of Patent: *Apr. 16, 2019

(54) REUSABLE PRODUCE CONTAINERS AND RELATED METHODS

(71) Applicant: Inteplast Group Corporation, Livingston, NJ (US)

(72) Inventor: Gregory A. Carman, Victoria, TX (US)

(73) Assignee: Inteplast Group Corporation, Livingston, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/387,386

(22) Filed: Dec. 21, 2016

(65) Prior Publication Data

US 2017/0101212 A1   Apr. 13, 2017

Related U.S. Application Data

(63) Continuation of application No. 14/726,201, filed on May 29, 2015, now Pat. No. 9,527,622.

(51) Int. Cl.
*B65D 5/10* (2006.01)
*B65D 85/34* (2006.01)
(Continued)

(52) U.S. Cl.
CPC .............. *B65D 5/103* (2013.01); *B65D 5/003* (2013.01); *B65D 5/22* (2013.01); *B65D 5/4295* (2013.01); *B65D 85/34* (2013.01); *Y02W 30/807* (2015.05)

(58) Field of Classification Search
CPC .......................... B65D 5/103; B65D 5/4295
(Continued)

(56) References Cited

U.S. PATENT DOCUMENTS 2,721,689 A    12/1952  Nye
2,844,294 A *  7/1958  Williams ............ B65D 5/2066
                                                229/120.03
(Continued)

FOREIGN PATENT DOCUMENTS

CN         101160241         4/2008

OTHER PUBLICATIONS

Concise Explanation of Relevance of CN 101160241.
(Continued)

*Primary Examiner* — Christopher Demeree
(74) *Attorney, Agent, or Firm* — Matthew D. Thayne; Thayne and Davis LLC

(57) ABSTRACT

Embodiments of foldable containers, such as foldable produce containers, and related sheets and methods. In some embodiments, a container may comprise a first side panel comprising a first locking tab and a rollover flap. The rollover flap is configured to be folded with respect to the first side panel to expose the first locking tab. The first side panel further comprises a clearance aperture, wherein the first locking tab is positioned within the clearance aperture such that the clearance aperture provides spacing between the first locking tab and the rollover flap. The container may further comprise a first top panel comprising a slot for receiving the first locking tab. The first top panel may further comprise a first locking flap configured to extend adjacent to an exterior surface of the container to secure the first top panel in a closed position to at least partially enclose the container.

20 Claims, 10 Drawing Sheets

(51) Int. Cl.
*B65D 5/42* (2006.01)
*B65D 5/00* (2006.01)
*B65D 5/22* (2006.01)

(58) Field of Classification Search
USPC .......... 229/143, 178, 915, 919, 120, 122.32, 229/148, 127
See application file for complete search history.

(56) References Cited

U.S. PATENT DOCUMENTS

| | | | |
|---|---|---|---|
| 3,973,723 A | 8/1976 | Owens | |
| 4,082,215 A | 4/1978 | Eichenauer | |
| 4,134,533 A | 1/1979 | Heavner | |
| 4,158,410 A | 6/1979 | Novatny | |
| 4,236,740 A * | 12/1980 | Sorenson | B65D 5/6644 229/143 |
| 4,245,773 A | 1/1981 | Stollberg | |
| 4,347,968 A | 9/1982 | Cornell et al. | |
| 4,883,221 A * | 11/1989 | Brundage | B65D 5/0045 229/143 |
| 5,141,149 A | 8/1992 | Fulton | |
| 5,458,283 A * | 10/1995 | Southwell | B65D 5/4295 229/178 |
| 5,649,663 A | 7/1997 | Pestow, Jr. | |
| 6,138,904 A | 10/2000 | Baird et al. | |
| 6,158,652 A | 12/2000 | Ruiz et al. | |
| 6,176,419 B1 | 1/2001 | Holley, Jr. | |
| D447,938 S | 9/2001 | Tsuruishi | |
| 6,899,266 B2 * | 5/2005 | Conway | B65D 5/0025 229/169 |
| 7,207,473 B2 | 4/2007 | Fry | |
| 7,374,076 B2 | 5/2008 | Holley | |
| 8,136,717 B2 | 3/2012 | De Paula | |
| 8,827,142 B2 | 9/2014 | Smith | |
| 9,469,078 B2 | 10/2016 | Aganovic | |
| 9,475,606 B2 | 10/2016 | Ball | |
| 9,493,268 B2 | 11/2016 | Loftin | |
| D773,294 S | 12/2016 | Choi | |
| 9,527,622 B2 | 12/2016 | Carman | |
| D786,063 S | 5/2017 | Choi | |
| 2006/0157546 A1 | 7/2006 | Holley | |
| 2009/0277954 A1 | 11/2009 | De Paula | |
| 2010/0219232 A1 | 9/2010 | Smith | |
| 2015/0246745 A1 | 9/2015 | Loftin | |
| 2015/0251797 A1 * | 9/2015 | Carman | B65D 5/0254 229/148 |
| 2016/0347496 A1 | 12/2016 | Carman | |

OTHER PUBLICATIONS

U.S. Appl. No. 15/169,360, Office Action dated Aug. 3, 2017, 7 pgs.
U.S. Appl. No. 15/712,013, Office Action dated Jan. 2, 2018, 11 pgs.
U.S. Appl. No. 15/169,360, Office Action dated Jan. 5, 2018, 8 pgs.
U.S. Appl. No. 15/712,013, Office Action dated Jul. 19, 2018, 07 pgs.

* cited by examiner

REUSABLE PRODUCE CONTAINERS AND RELATED METHODS

RELATED APPLICATIONS

This application is a continuation of co-pending U.S. patent application Ser. No. 14/726,201, filed on May 29, 2015 and titled "REUSABLE PRODUCE CONTAINERS AND RELATED METHODS," which application is incorporated by reference herein in its entirety.

SUMMARY

Embodiments of sheets configured to be assembled into foldable containers, such as foldable, plastic, produce containers, are disclosed herein, along with implementations of related methods. Finished containers are also described herein. In some embodiments, such sheets/containers may comprise a plastic, such as a corrugated plastic, and may be configured to be sufficiently sturdy to withstand multiple uses. Some embodiments may even allow for disassembly and reassembly where needed.

In a more specific example of an embodiment of a substantially planar sheet for folding into a container, the container may comprise a first locking tab positioned on a first panel of the sheet and a second locking tab positioned on a second panel of the sheet. The first panel may be configured to be folded with respect to the second panel during a folding process for folding the sheet into a three-dimensional container. The second locking tab may be configured to be positioned adjacent to the first locking tab after at least one folding step in which the first panel is folded relative to the second panel.

Some embodiments may further comprise a first locking flap positioned on a third panel of the sheet, wherein the third panel is configured to be folded with respect to the first and second panels during the folding process. The first locking flap may comprise a slot configured to receive the first locking tab and the second locking tab to secure the first panel, the second panel, and the third panel in place to at least partially define the three-dimensional container after the folding process.

In some embodiments, the first locking flap may comprise a door configured to open to expose the slot for receiving the first locking tab and the second locking tab upon bending the first locking flap with respect to the third panel. In some embodiments, the sheet may be configured such that, upon folding the third panel with respect to the first and second panels during the folding process, at least one of the first locking tab and the second locking tab automatically engages the door to cause the third locking flap to bend and expose the slot.

Some embodiments may comprise additional locking tabs and/or panels. For example, some embodiments may comprise a third locking tab positioned on a fourth panel of the sheet, wherein the fourth panel is configured to be folded with respect to the first, second, and third panels during the folding process, wherein the third locking tab is configured to be received in the slot along with the first locking tab and the second locking tab.

Similarly, some embodiments may comprise a third locking tab, wherein the third locking tab extends beyond a peripheral edge of the first panel for receipt in a second slot positioned within a third panel of the sheet.

In some embodiments, the first locking tab may be positioned within a clearance aperture such that the clearance aperture provides spacing between the first locking tab and a peripheral portion of the first panel.

Some embodiments may further comprise a third locking tab positioned on the first panel, wherein the third locking tab extends beyond a peripheral edge of the first panel and a second slot positioned on a third panel of the sheet. In some such embodiments, the first panel may comprise a rollover flap, wherein the first locking tab is positioned within the rollover flap, and wherein the first locking tab is configured to be received in the second slot after the rollover flap is folded over against the first panel to expose the first locking tab.

In some embodiments, the sheet may be configured to be folded into a three-dimensional container without the use of any adhesives or other bonding techniques.

In another specific example of a substantially planar sheet for folding into a container, the sheet may comprise a first panel comprising a rollover flap. The rollover flap may comprise a clearance aperture. A first locking tab may be positioned on the rollover flap and may extend beyond a peripheral edge of the first panel. The sheet may further comprise a second locking tab positioned within the clearance aperture such that the clearance aperture provides spacing between the second locking tab and the rollover flap. The sheet may further comprise a second panel comprising a slot for receiving the first locking tab, wherein the first locking tab is configured to be received in the slot after the rollover flap is folded over against the first panel to expose the second locking tab.

Some embodiments may further comprise a third panel comprising third locking tab and a fourth panel comprising a first locking flap. The fourth panel may be configured to be folded with respect to the first and third panels during a folding process for folding the sheet into a three-dimensional container. The first locking flap may comprise a second slot configured to receive the second locking tab and the third locking tab to secure the first panel, the third panel, and the fourth panel in place to at least partially define the three-dimensional container after the folding process.

In some embodiments, the clearance aperture may define a clearance distance between the second locking tab and the rollover flap at least as great as a distance with which the first locking tab extends beyond the peripheral edge of the first panel such that the rollover flap can be folded over with the third locking tab within the clearance aperture and such that the third locking tab can slide laterally within the clearance aperture and adjacent to the second locking tab by a distance at least as great as the distance with which the first locking tab extends beyond the peripheral edge of the first panel.

In some embodiments, the sheet, or at least one or more panels of the sheet, may comprise corrugated flutes. In some such embodiments, the first locking tab may comprise corrugated flutes that extend in a first direction, the second panel may comprise corrugated flutes defining the slot that extend in a second direction at an angle with respect to the first direction. In some embodiments, the second direction may be at least substantially perpendicular to the first direction.

In some embodiments, the first locking tab may extend in a direction at least substantially perpendicular to a direction in which the second locking tab extends.

In a specific example of a container according to some embodiments, the container may comprise a first side panel comprising a first locking tab and a second side panel positioned adjacent and at least substantially parallel to the first side panel. The second side panel may comprise a second locking tab. Some embodiments may further comprise a first top panel comprising a slot for receiving the first locking tab and the second locking tab with the first locking tab adjacent and at least substantially parallel to the second locking tab. The first top panel may further comprise a first locking flap configured to extend adjacent to an exterior surface of the container at least substantially parallel to the first locking tab and second locking tab to secure the first top panel in a closed position to at least partially enclose the container.

In some embodiments, the first locking tab may comprise a shape that is at least substantially identical to a shape of the second locking tab.

In some embodiments, the first side panel may further comprise a rollover flap configured to be folded with respect to the first side panel to expose the first locking tab.

In some embodiments, the first side panel may further comprise a clearance aperture. The first locking tab may be positioned within the clearance aperture such that the clearance aperture provides spacing between the first locking tab and the rollover flap.

In some embodiments, the first side panel further comprises a third locking tab extending beyond a peripheral edge of the first side panel. In some such embodiments, the third locking tab may be positioned on the rollover flap.

The features, structures, steps, or characteristics disclosed herein in connection with one embodiment may be combined in any suitable manner in one or more alternative embodiments.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Consistent with embodiments disclosed herein, foldable containers, such as reusable containers, may be utilized to store produce. In some embodiments, such containers may comprise corrugated plastic containers. For example, in certain embodiments, the plastic containers disclosed herein may be configured to store and/or transport corn. Utilizing plastic containers offers certain benefits over conventional wood crates, wire crates, and/or wax-coated corrugated cardboard storage containers to store corn. For example, corrugated plastic containers configured to store corn consistent with embodiments disclosed herein may be reusable, may be assembled more quickly, may be generally lighter, may be less prone to causing injuries, may be generally more durable (especially through demanding harvesting, packing, post-harvest cooling, and shipping processes), may be may be recyclable or otherwise more sustainable, may resist mold growth, may provide certain container labeling and/or marking benefits, may be assembled/folded without requiring the use of additional adhesives or mechanical fastening, and/or may provide an improved sterile environment for packing fresh produce. Various additional features and benefits may be provided in connection with particular embodiments, as discussed in detail below.

Figure 1:
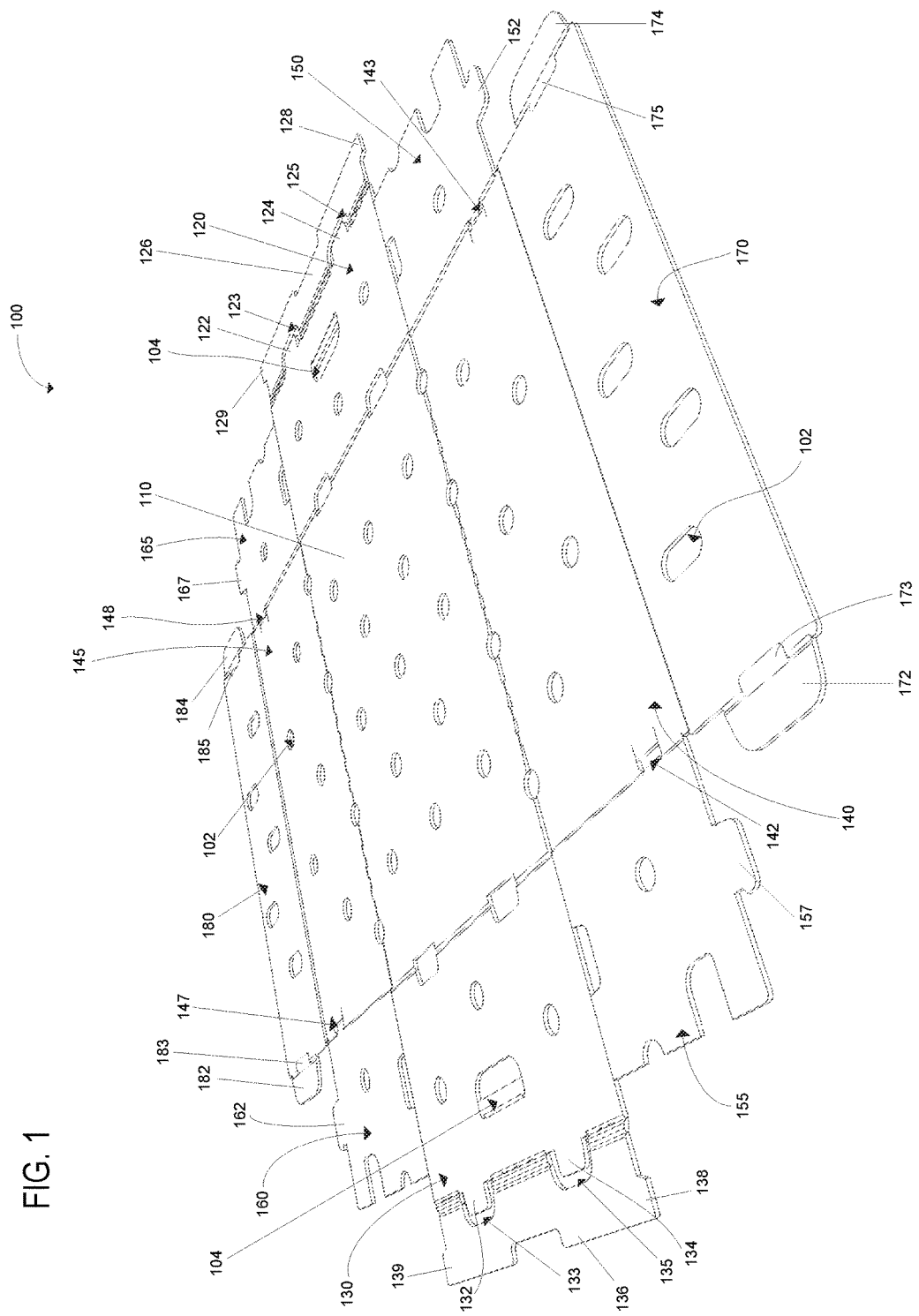
FIG. 1 illustrates a sheet configured for folding into a container consistent with some embodiments.

FIG. 1 illustrates a sheet 100 consistent with embodiments of the present disclosure. Sheet 100 comprises a substantially planar sheet that may be folded into a three-dimensional container. In some embodiments, sheet 100 may comprise a plastic. In some such embodiments, sheet 100 may comprise a corrugated plastic, such as a plastic made up of corrugated flutes.

Sheet 100 comprises a plurality of panels configured to be folded with respect to one another during a folding/assembly process. More particularly, sheet 100 comprises a first panel 110 that, when folded/assembled, will become a bottom to a container. Similarly, sheet 100 comprises a second panel 120 configured to serve as a side wall of the container, a third panel 130 configured to serve as another side wall of the container opposite from second panel 120, a fourth panel 140 configured to serve as another side wall of the container perpendicular to the side walls formed by second panel 120 and third panel 130, and a fifth panel 145 configured to serve as another side wall of the container opposite from that formed by fourth panel 140. One or more vent openings 102 may be formed in one or more of the various panels to allow for water and/or air circulation throughout the container. In addition, handles 104 may be provided within one or more panels (preferably in panels configured to be positioned opposite from one another after assembly/folding) to improve ease of transport.

Sheet 100 further comprises additional panels 150, 155, 160 and 165. Panels 155 and 160 are configured to be positioned adjacent to and at least substantially parallel to panel 130. In the depicted embodiment, panels 155 and 160 are configured to be positioned at least substantially in the same plane. In other words, panels 155 and 160 collectively define a sidewall adjacent to and parallel with panel 130. However, as discussed below, other embodiments are contemplated in which similar panels may instead overlap. Similarly, panels 150 and 165 are configured to be positioned adjacent to and at least substantially parallel to panel 120. In the depicted embodiment, panels 150 and 165 are configured to be positioned at least substantially in the same plane so as to collectively define another sidewall adjacent to and parallel with panel 120.

Panel 120 comprises two locking tabs, namely, locking tab 122 and locking tab 124. As discussed in greater detail below, locking tabs 122 and 124 are configured to be positioned within respective slots defined in other panels to secure a lid or top portion of the container in place. Similarly, panel 130 comprises first locking tab 132 and a second locking tab 134.

Each of the various locking tabs 122/124 and 132/134 is positioned within a corresponding clearance aperture. More particularly, locking tabs 122 and 124 are positioned within clearance apertures 123 and 125, respectively. Similarly, locking tabs 132 and 134 are positioned within clearance apertures 133 and 135, respectively. Clearance apertures 123 and 125 are formed within a first rollover flap 126 and clearance apertures 133 and 135 are formed within a second rollover flap 136. Rollover flaps 126 and 136 are each configured to be folded over against their respective panels (panels 120 and 130, respectively) to expose their respective locking tabs. Clearance apertures 123, 125, 133, and 135 extend about the peripheries of their respective locking tabs other than along a base portion of the locking tabs at which the locking tabs are connected with their respective panels. The functionality of the clearance apertures will be discussed below.

Rollover flaps 126 and 136 further comprise additional locking tabs that extend in a different direction than the respective locking tabs 122/124 and 132/134 of each such rollover flap. More particularly, in the depicted embodiment, rollover flap 126 comprises a locking tab 128 that preferably extends in a direction at least substantially perpendicular to locking tabs 122 and 124 and another locking tab 129 that extends in an opposite direction to locking tab 128, but also at least substantially perpendicular to locking tabs 122 and 124. Similarly, rollover flap 136 comprises a locking tab 138 that preferably extends in a direction at least substantially perpendicular to locking tabs 132 and 134 and another locking tab 139 that extends in an opposite direction to locking tab 138, but also at least substantially perpendicular to locking tabs 132 and 134.

As illustrated in the figures, locking tabs 128/129 and 138/139 each extends beyond a peripheral edge of their respective panels, and a corresponding peripheral edge of their respective rollover flaps. Thus, locking tab 128 extends beyond a first peripheral edge of panel 120 and locking tab 129 extends beyond a second peripheral edge of panel 120 opposite from the first peripheral edge. Similarly, locking tab 138 extends beyond a first peripheral edge of panel 130 and locking tab 139 extends beyond a second peripheral edge of panel 130 opposite from the first peripheral edge. The functionality of this feature of locking tabs 128/129 and 138/139 will be discussed and be more apparent in connection with other figures below.

Panels 140 and 145 each comprises two slots formed at opposite ends of the respective panels. Thus, panel 140 comprises a first slot 142 positioned along a first peripheral edge of panel 140 and further comprises a second slot 143 positioned along a second peripheral edge of panel 140 opposite from the first peripheral edge. Similarly, panel 145 comprises a first slot 147 positioned along a first peripheral edge of panel 145 and further comprises a second slot 148 positioned along a second peripheral edge of panel 145 opposite from the first peripheral edge. Each of these slots 142, 143, 147, and 148 is configured to receive a corresponding locking tab from another panel, as discussed in greater detail below. In some embodiments, one or more (in some embodiments, all) of these slots 142, 143, 147, and 148 may comprise extended side cuts along opposing ends of the respective slots to improve the ease with which their respective locking tabs 128, 129, 138, and 139 can enter the slots during assembly and disassembly.

Each of panels 150, 155, 160, and 165 comprises another respective locking tab. Panel 150 comprises locking tab 152, panel 155 comprises locking tab 157, panel 160 comprises locking tab 162, and panel 165 comprises locking tab 167.

Each of these locking tabs 152, 157, 162, and 167 comprises a shape that is substantially identical to that of locking tabs 122, 124, 132, and 134. However, unlike locking tabs 122, 124, 132, and 134, locking tabs 152, 157, 162, and 167 each comprises a hooked portion at one end. As discussed in greater detail below, following assembly, locking tabs 122, 124, 132, and 134 are configured to be positioned adjacent to and parallel with locking tabs 167, 152, 162, and 157, respectively, within a corresponding slot from another panel, and the hooked portions of locking tabs 152, 157, 162, and 167 are configured to engage a peripheral edge of such slot to maintain the container in a desired configuration.

Sheet 100 further comprises additional panels 170 and 180, both of which are configured to form a lid or top of a container, and therefore may be referred to herein as "top panels." Each of panels 170 and 180 comprises two corresponding locking flaps. More particularly, top panel 170 comprises a first locking flap 172 at a first end a second locking flap 174 at a second end opposite from the first end. Similarly, panel 180 comprises a first locking flap 182 positioned at a first end and a second locking flap 184 positioned at a second end opposite from the first end.

Each of the various locking flaps 172, 174, 182, and 184 comprises a door extending in the opposite direction relative to the respective locking flap. Thus, locking flap 172 comprises door 173, locking flap 174 comprises door 175, locking flap 182 comprises door 183, and locking flap 184 comprises door 185. As described in greater detail below, each of these doors is configured to pivot to an open position to expose a corresponding slot (see, for example, FIG. 4, in which door 185 has been pivoted to expose slot 186) for receiving locking tabs from other panels upon bending the respective locking flaps with respect to their panels. Although locking flap 184 is depicted as having been pivoted to expose slot 186 in FIG. 4, it should be understood that, in preferred embodiments, each of the various locking flaps, including locking flap 184, may be in a flat state with door 185 in a closed positioned prior to engaging the corresponding panel (panel 180) with one or more locking tabs.

In some embodiments, the sheet 100 may be configured such that, upon folding a panel with respect to one or more other panels during a folding process, one or more locking tabs are configured to automatically engage the door to cause the respective locking flap to bend and expose its corresponding slot. In some embodiments, the locking tabs and locking flaps may be positioned and configured to simultaneously enter the slot and cause the locking flap to pivot during the folding process.

Figure 2:
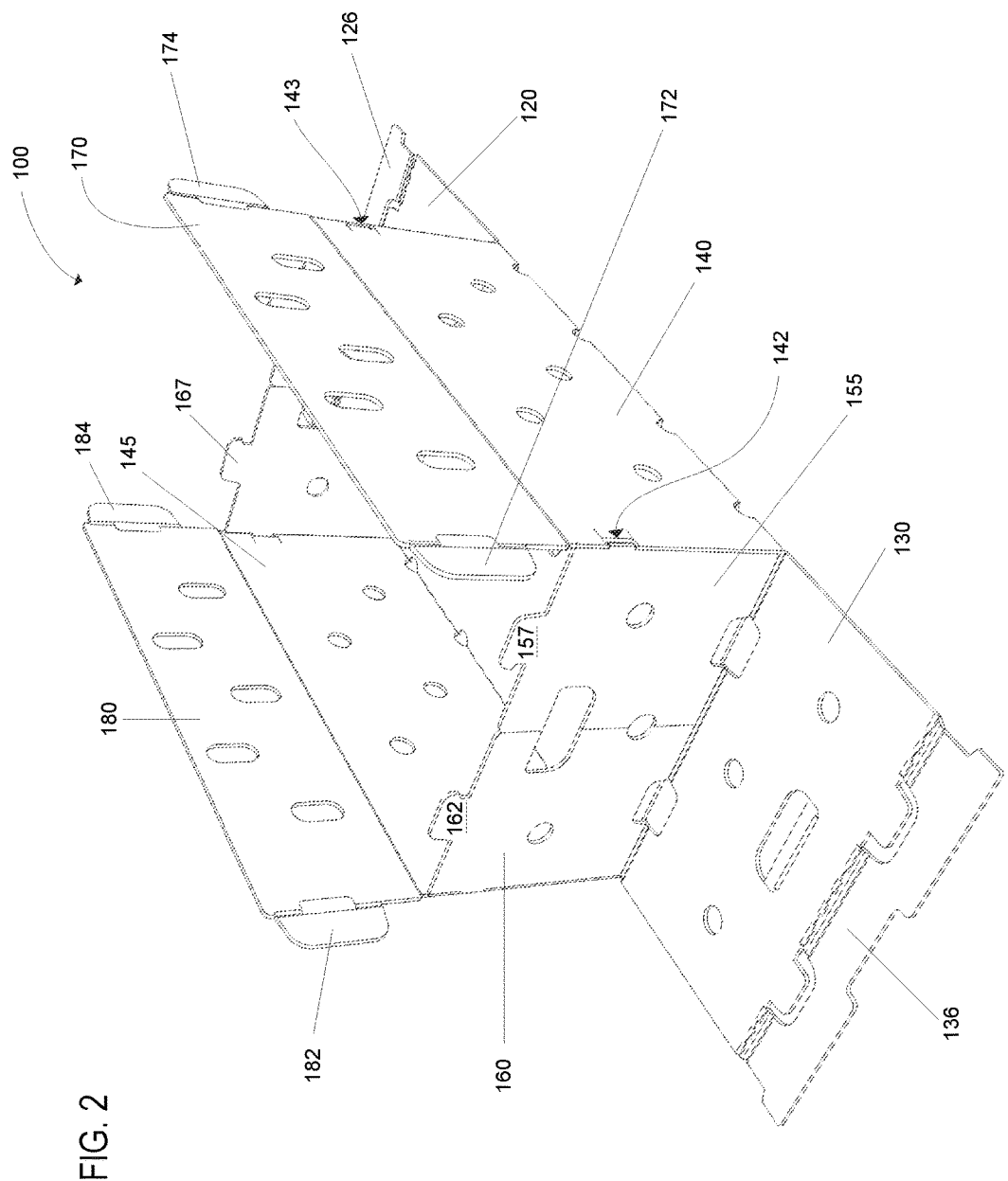
FIG. 2 is a perspective view of the sheet of FIG. 1 following an initial series of folding steps has taken place for folding the sheet into a container.

FIG. 2 depicts sheet 100 following an initial series of folding steps for folding the sheet 100 into a container, namely, a box. As shown in this figure, panels 155 and 160 have been folded up and the corresponding panels on the opposite side (panels 150 and 165) have also been folded up. Similarly, panels 140 and 145 have been folded up such that they define opposite side walls of the container and such that panels 155 and 160 are coplanar and together define another sidewall perpendicular to the sidewall defined by panels 140 and 145 (the same is true for the opposite side).

Figure 3:
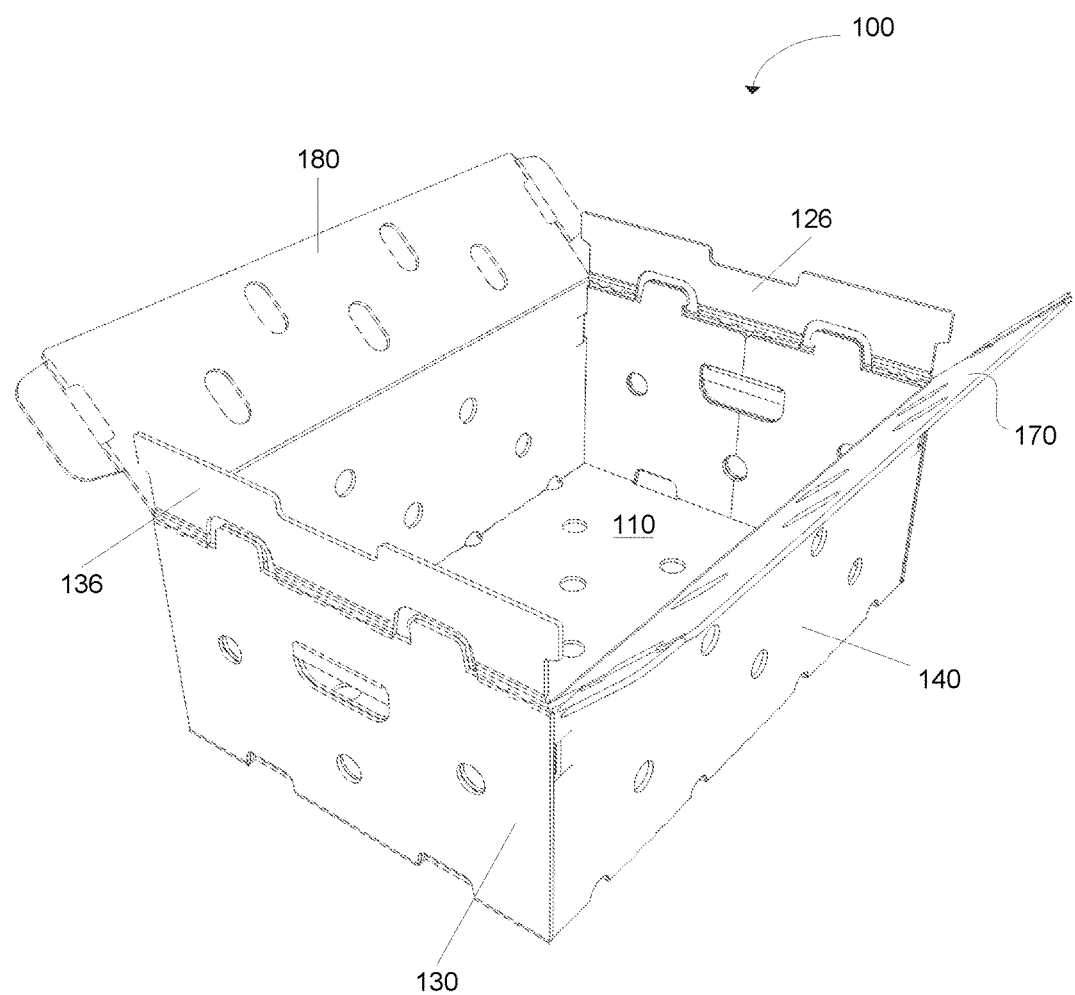
FIG. 3 is a perspective view of the sheet of FIG. 1 after additional folding steps have taken place.

FIG. 3 is a perspective view of sheet 100 after additional folding steps have taken place. More particularly, panels 120 and 130 have been folded up to form a first side wall that is parallel with coplanar panels 150 and 165 and a second side wall that is parallel with coplanar panels 155 and 160.

Figure 4:
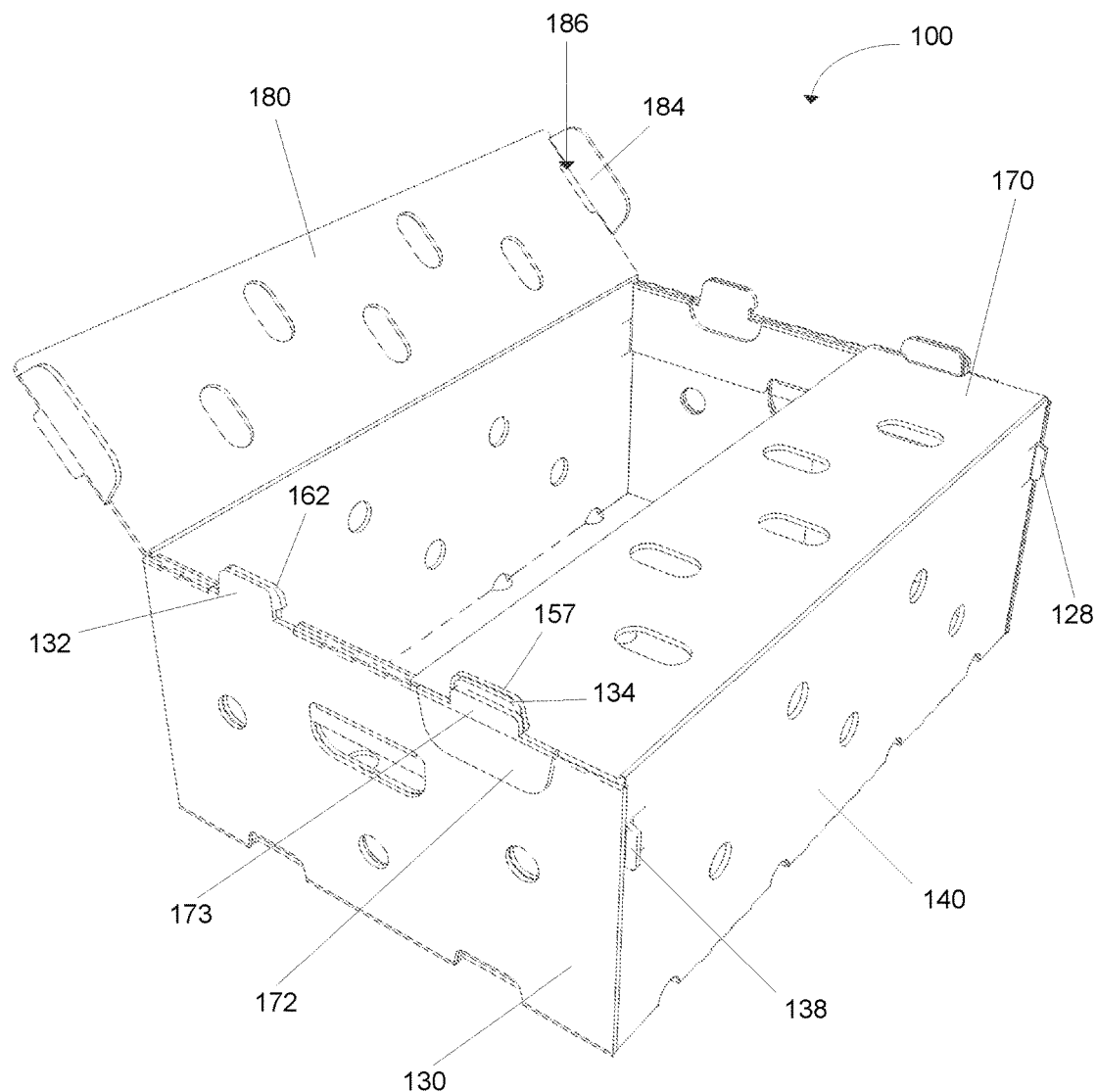
FIG. 4 is a perspective view of the sheet of FIG. 1 following further folding steps.

FIG. 4 is another perspective view of sheet 100 following further folding steps. In the state of FIG. 4, rollover flaps 126 and 136 have been folded into the interior of the container and locking tabs 128, 129, 138, and 139 have been inserted into slots 143, 148, 142, and 147, respectively. In some preferred embodiments, slots 142, 143, 147, and 148 may be positioned at least about one inch from the top of the assembled container to ensure integrity and prevent an area of weakness for the container. In preferred embodiments, slots 142, 143, 147, and 148 are positioned in an area of their respective panel that is between 50% of the height of the panel (i.e., with respect to slot 142, 50% of the distance between the border with panel 110 and the border with panel 170) and one inch from the top of the assembled container (i.e., with respect to slot 142, one inch from the border with panel 170).

In addition, in the stage depicted in FIG. 4, one of the two top panels—namely, top panel 170—has been folded down to engage locking flaps 172 and 174 at opposite ends of panel 170. Each of the various locking flaps, including locking flaps 172 and 174, may be configured such that, upon folding of a panel (in the depicted embodiment, top panel 170) towards the locking flap, one or more locking tabs are positioned and configured to engage a door of the locking flap to pivot the door to expose a slot for receiving one or more locking tabs. Thus, in the depicted embodiment, folding panel 170 towards locking tabs 134 and 157 may cause locking tabs 134 and 157 to engage door 173 and pivot locking flap 172 to expose a slot. Following such engagement, locking flap 172 and door 173 may be positioned parallel to locking tabs 134 and 157 and locking flap 172 may engage the exterior surface of panel 130, as depicted in FIG. 4. The same may be true for the other locking flaps.

The various clearance apertures may extend about the peripheries of their respective locking tabs to provide clearance to fold over the rollover flaps without folding over or otherwise deforming the corresponding locking tabs. In addition, these apertures may be configured such that, once the user has folded the rollover flap over the corresponding locking tab(s), the container may be released to allow for repositioning of a user's hands to complete assembly. Because the side walls/panels will naturally try to fall down, the clearance aperture(s) may also allow for an optimal amount of displacement so there is clearance for each of the wider side locking tabs (locking tabs 128/129 and 138/139) to reach its corresponding slot with minimal interaction with the side wall, thereby further decreasing the chance for deformation.

Thus, in certain preferred embodiments, the added width of the clearance aperture(s) relative to the locking tabs positioned within the clearance aperture(s) (locking tabs 122, 124, 132, and 134, for example) may be at least about 65% of the length of the side locking tab(s) (locking tabs 128, 129, 138, and 139, for example). In some embodiments, the added width of the clearance aperture(s) relative to the locking tabs positioned within the clearance aperture(s) may be at least about 75% of the length of the side locking tab(s). In some embodiments, the added width of the clearance aperture(s) relative to the locking tabs positioned within the clearance aperture(s) may be at least about 80% of the length of the side locking tab(s). In some embodiments, the added width of the clearance aperture(s) relative to the locking tabs positioned within the clearance aperture(s) may be between about 60% and about 100% of the length of the side locking tab(s). In some such more preferred embodiments, the added width of the clearance aperture(s) relative to the locking tabs positioned within the clearance aperture(s) may be between about 65% and about 85% of the length of the side locking tab(s).

Figure 5:
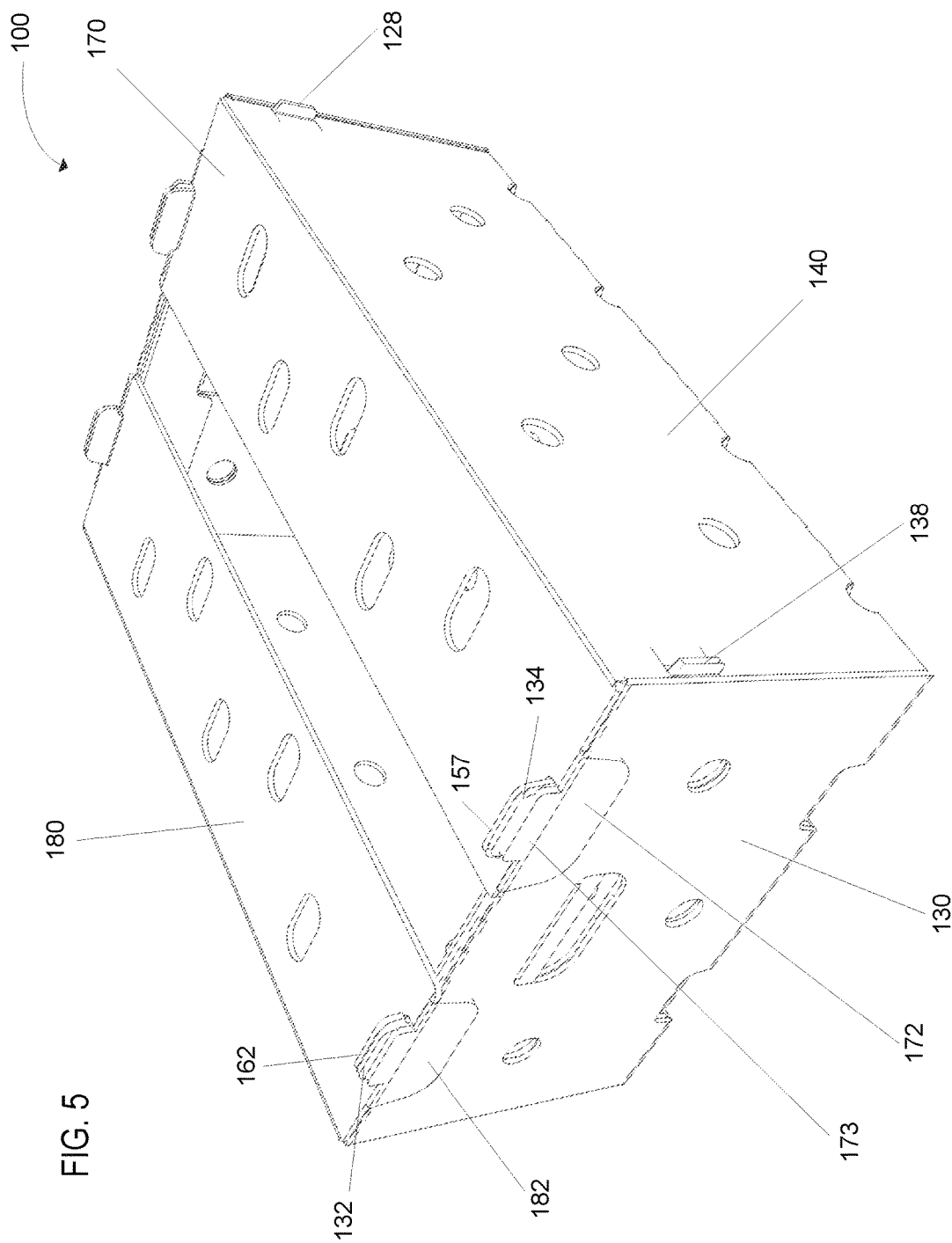
FIG. 5 is a perspective view of the sheet of FIG. 1 following completion of a folding process for folding the sheet into a container.

FIG. 5 is a perspective view of sheet 100 following completion of the folding process for folding the sheet into a container. As shown in this figure, the other top panel (panel 180) has been folded over to engage its corresponding locking flaps with corresponding locking tabs. In the position shown in FIG. 5, each of the various panels are locked into place to define a sturdy container suitable for use in storing and/or transporting produce, for example. In certain preferred embodiments, the structure and/or materials of the sheet 100 may further be configured to allow for the container to be used multiple times. In certain preferred embodiments, the sheet 100 may therefore comprise a corrugated plastic material.

Figure 6:
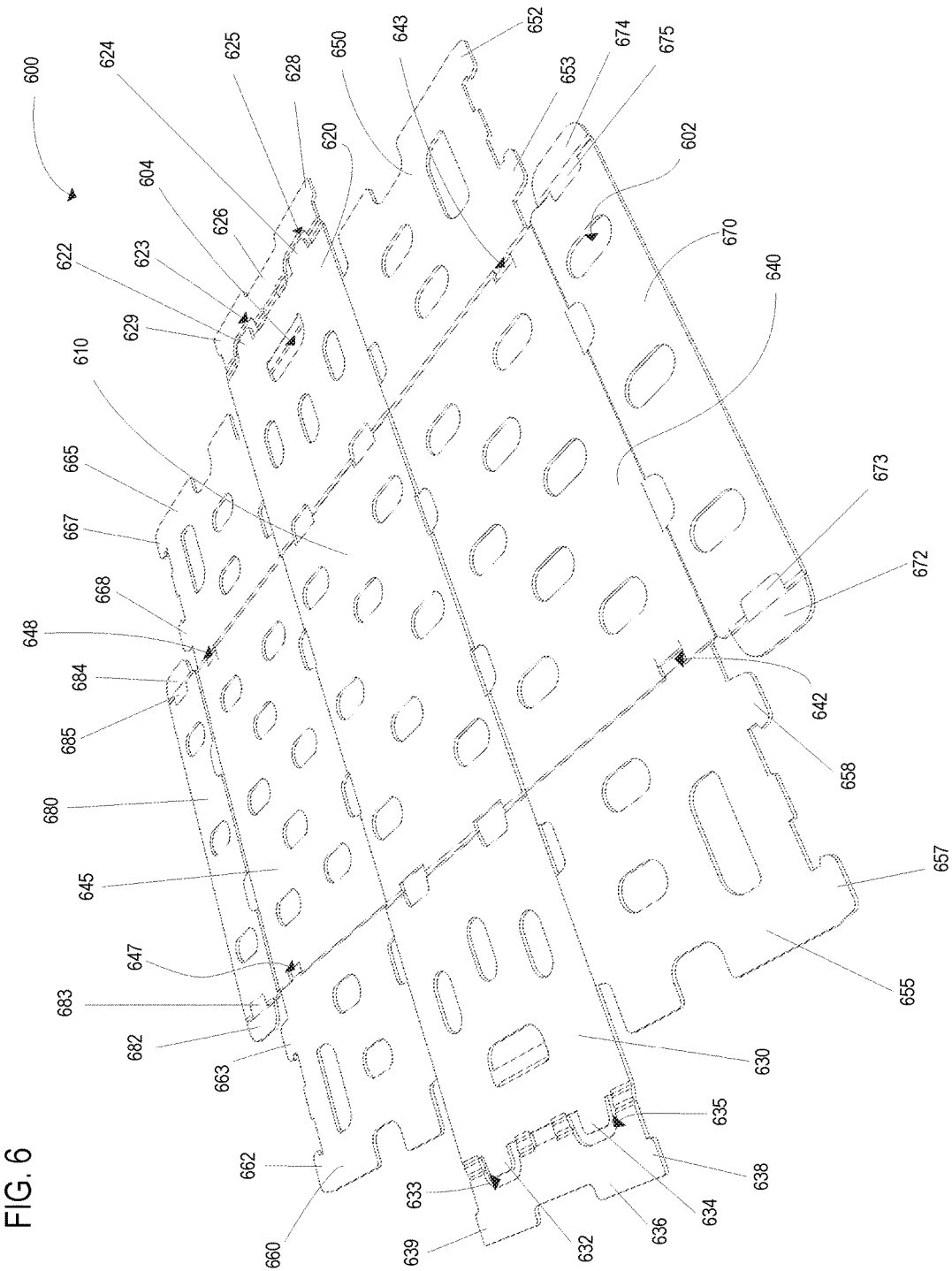
FIG. 6 illustrates another embodiment of a sheet configured for folding into a container.

FIG. 6 illustrates another embodiment of a sheet 600 configured for folding into a container, such as a produce container. Sheet 600 is similar to sheet 100 with a few differences explained below. Most notably, sheet 600 comprises three layers of side panels along two sides of the finished container. Two of these layers are made up by overlapping side panels each comprising two locking tabs. One such locking tab from a first such side panel is configured to be positioned adjacent to and parallel with another locking tab from a second such side panel, along with still another locking tab from a third side panel, and all three of these locking tabs are configured to be positioned within a single slot associated with a single locking flap, as explained in greater detail below.

Similar to sheet 100, sheet 600 comprises a plurality of panels configured to be folded with respect to one another during a folding/assembly process. More particularly, sheet 600 comprises a first panel 610 that, when folded/assembled, will become a bottom to a container. Similarly, sheet 600 comprises a second panel 620 configured to serve as a side wall of the container, a third panel 630 configured to serve as another side wall of the container opposite from second panel 620, a fourth panel 640 configured to serve as another side wall of the container perpendicular to the side walls formed by second panel 620 and third panel 630, and a fifth panel 645 configured to serve as another side wall of the container opposite from that formed by fourth panel 640. One or more vent openings 602 may be formed in one or more of the various panels to allow for water and/or air circulation throughout the container. In addition, handles 604 may be provided within one or more panels to improve ease of transport.

Sheet 600 further comprises additional panels 650, 655, 660 and 665. Panels 655 and 660 are configured to be positioned adjacent to and at least substantially parallel to panel 630. In the depicted embodiment, panels 655 and 660 are configured to be positioned adjacent to one another in an overlapping configuration (ultimately, along with panel 630). Similarly, panels 650 and 665 are configured to be positioned adjacent to and at least substantially parallel to panel 620. In the depicted embodiment, panels 650 and 665 are configured to be positioned adjacent to one another in an overlapping configuration.

Panel 620 comprises two locking tabs, namely, locking tab 622 and locking tab 624. As discussed in greater detail below, locking tabs 622 and 624 are configured to be positioned within respective slots defined in other panels to secure a lid or top portion of the container in place. Similarly, panel 630 comprises first locking tab 632 and a second locking tab 634.

Each of the various locking tabs 622/624 and 632/634 is positioned within a corresponding clearance aperture. More particularly, locking tabs 622 and 624 are positioned within clearance apertures 623 and 625, respectively. Similarly, locking tabs 632 and 634 are positioned within clearance apertures 633 and 635, respectively. Clearance apertures 623 and 625 are formed within a first rollover flap 626 and clearance apertures 633 and 635 are formed within a second rollover flap 636. Rollover flaps 626 and 636 are each configured to be folded over against their respective panels (panels 620 and 630, respectively) to expose their respective locking tabs.

Rollover flaps 626 and 636 further comprise additional locking tabs that extend in a different direction (perpendicular) than the respective locking tabs 622/624 and 632/634 of each such rollover flap.

As illustrated in the figures, locking tabs 628/629 and 638/639 each extends beyond a peripheral edge of their respective panels, and a corresponding peripheral edge of their respective rollover flaps.

Panels 640 and 645 each comprises two slots formed at opposite ends of the respective panels. Thus, panel 640 comprises a first slot 642 positioned along a first peripheral edge of panel 640 and further comprises a second slot 643 positioned along a second peripheral edge of panel 640 opposite from the first peripheral edge. Similarly, panel 645 comprises a first slot 647 positioned along a first peripheral edge of panel 645 and further comprises a second slot 648 positioned along a second peripheral edge of panel 645 opposite from the first peripheral edge. Each of these slots 642, 643, 647, and 648 is configured to receive a corresponding locking tab from another panel, namely, locking tabs 638, 628, 639, and 629, respectively.

Each of panels 650, 655, 660, and 665 comprises two additional respective locking tabs each. Thus, panel 650 comprises locking tabs 652 and 653, panel 655 comprises locking tabs 657 and 658, panel 660 comprises locking tabs 662 and 663, and panel 665 comprises locking tabs 667 and 668. Like locking tabs 152, 157, 162, and 167, in some embodiments each of locking tabs 652, 653, 657, 658, 662, 663, 667, and 668 may comprise a hooked portion at one end. As shown in FIG. 6, these hooked portions may face each other. As discussed in greater detail below, following assembly, an upper locking tab of each of the aforementioned locking tabs is configured to be positioned adjacent to and parallel with a lower locking tab of another panel, and vice versa. Moreover, these two adjacent locking tabs are further configured to be positioned adjacent to a third locking tab, that may be exposed upon pivoting of a locking flap, such that three adjacent locking tabs may be positioned within a single corresponding slot from another panel, and the hooked portions of one or more of these locking tabs may be configured to engage a peripheral edge of such slot to maintain the container in a desired configuration.

Sheet 600 further comprises additional panels 670 and 680, both of which are configured to form a lid or top of a container. Each of panels 670 and 680 comprises two corresponding locking flaps. More particularly, top panel 670 comprises a first locking flap 672 at a first end a second locking flap 674 at a second end opposite from the first end. Similarly, panel 680 comprises a first locking flap 682 positioned at a first end and a second locking flap 684 positioned at a second end opposite from the first end.

Each of the various locking flaps 672, 674, 682, and 684 comprises a door extending in the opposite direction relative to the respective locking flap. Thus, locking flap 672 comprises door 673, locking flap 674 comprises door 675, locking flap 682 comprises door 683, and locking flap 684 comprises door 685. As described in greater detail below, each of these doors is configured to pivot to an open position to expose a corresponding slot (see, for example, FIG. 9, in which door 685 has been pivoted to expose slot 686) for receiving locking tabs from other panels upon bending the respective locking flaps with respect to their panels.

Sheet 600 may be configured such that, upon folding a panel with respect to one or more other panels during a folding process, one or more locking tabs are configured to automatically engage the door to cause the respective locking flap to bend and expose its corresponding slot. In some embodiments, the locking tabs and locking flaps may be positioned and configured to simultaneously enter the slot and cause the locking flap to pivot during the folding process.

Figure 7:
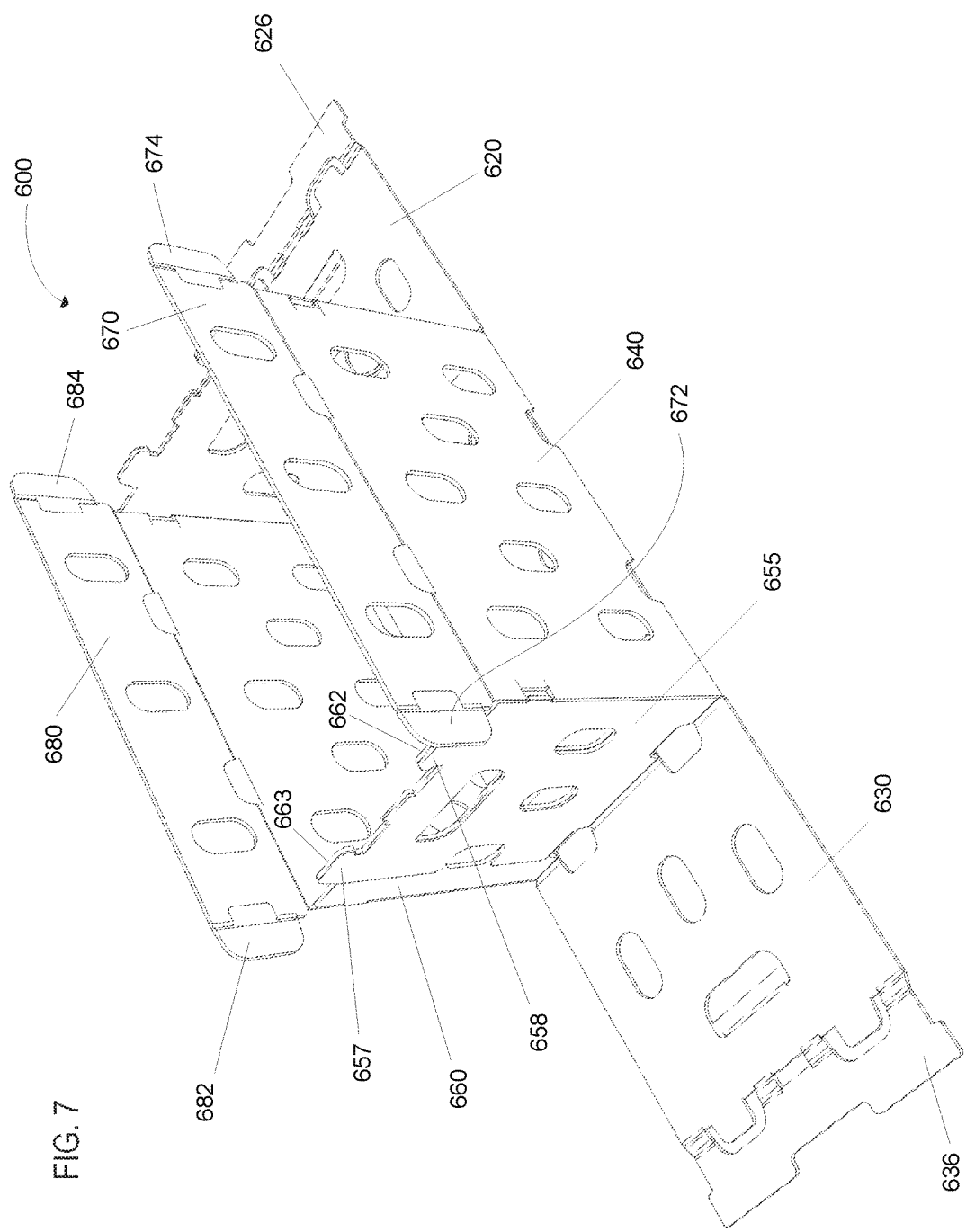
FIG. 7 is a perspective view of the sheet of FIG. 6 following an initial series of folding steps has taken place for folding the sheet into a container.

FIG. 7 depicts sheet 600 following an initial series of folding steps for folding the sheet 600 into a container, namely, a box. As shown in this figure, panels 655 and 660 have been folded up, along with the corresponding panels on the opposite side (panels 650 and 665). Similarly, panels 640 and 645 have been folded up such that they define opposite side walls of the container and such that panels 655 and 660 are positioned in an overlapping configuration to define a pair of parallel sidewalls perpendicular to the sidewall defined by panels 640 and 645 (the same is true for the opposite side).

As also shown in FIG. 7, locking tabs 663 and 657 have been positioned adjacent to one another. Likewise, locking tabs 658 and 662 have been positioned adjacent to one another.

Figure 8:
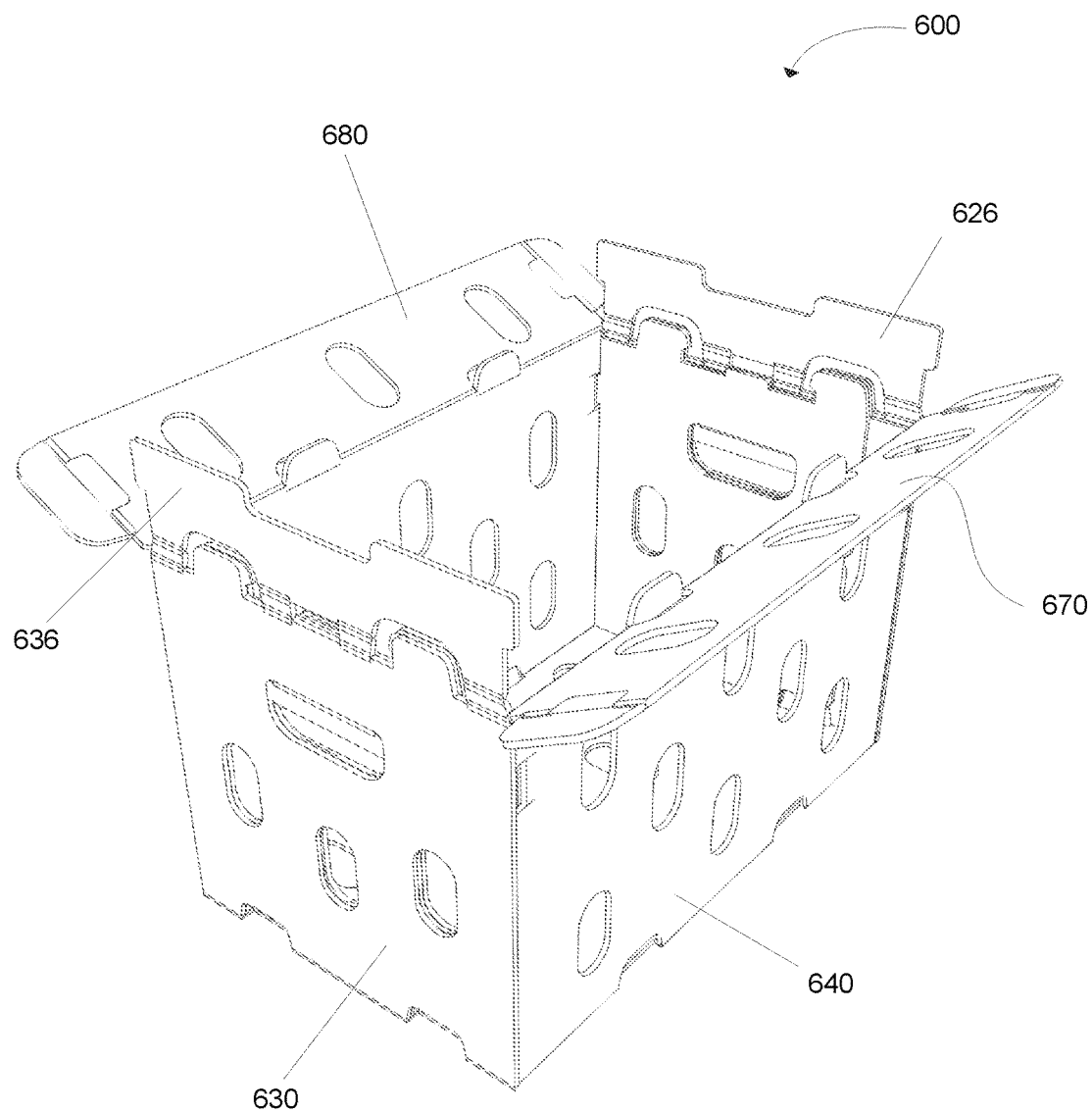
FIG. 8 is a perspective view of the sheet of FIG. 6 after additional folding steps have taken place.

FIG. 8 is a perspective view of sheet 600 after additional folding steps have taken place. More particularly, panels 620 and 630 have been folded up to form a first side wall that is parallel with overlapping panels 650 and 665 and a second side wall that is parallel with overlapping panels 655 and 660.

Figure 9:
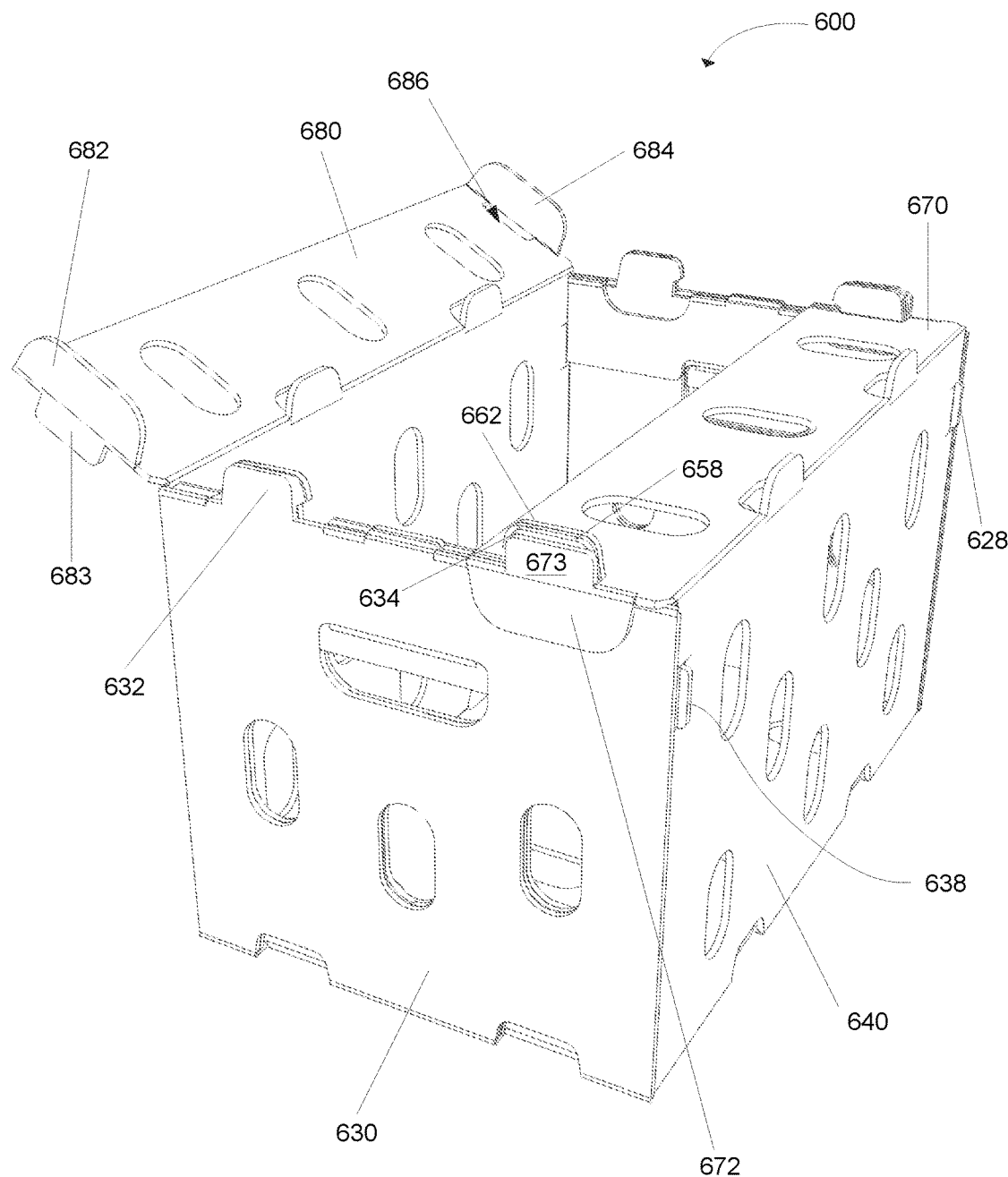
FIG. 9 is a perspective view of the sheet of FIG. 6 following further folding steps.

FIG. 9 is another perspective view of sheet 600 following further folding steps. In the state of FIG. 9, rollover flaps 626 and 636 have been folded into the interior of the container and locking tabs 628, 629, 638, and 639 have been inserted into slots 643, 647, 642, and 648, respectively.

In addition, in the stage depicted in FIG. 9, one of the two top panels—namely, top panel 670—has been folded down to engage locking flaps 672 and 674 at opposite ends of panel 670. With respect to locking flap 672, it has been pivoted against panel 630, and the slot exposed by pivoting door 673 of locking flap 672 has been filled by locking flaps 634, 658, and 662. Thus, in the closed lid configuration, door 673 is positioned parallel to three locking tabs. The same is true for the other locking flaps and their corresponding locking tabs and slots.

Figure 10:
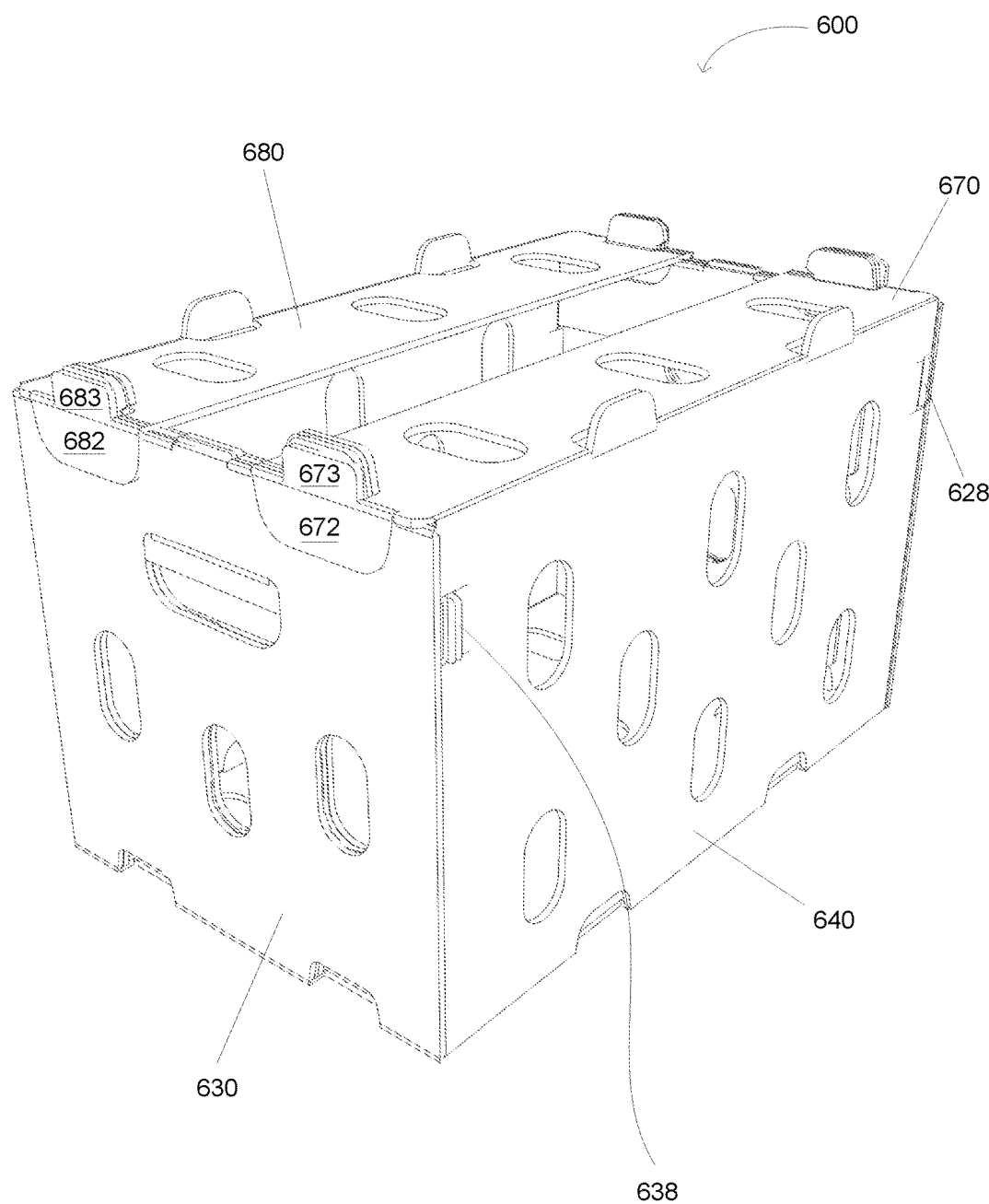
FIG. 10 is a perspective view of the sheet of FIG. 6 following completion of a folding process for folding the sheet into a container.

FIG. 10 is a perspective view of sheet 600 following completion of the folding process for folding the sheet 600 into a container. As shown in this figure, the other top panel (panel 680) has been folded over to engage its corresponding locking flaps with corresponding locking tabs. In the position shown in FIG. 10, each of the various panels are locked into place to define a sturdy container suitable for use in storing and/or transporting produce, for example. In certain preferred embodiments, the structure and/or materials of the sheet 600 may further be configured to allow for the container to be used multiple times.

With respect to any of the various embodiments disclosed herein, some such embodiments may be configured such that one or more (in some cases, all) of the various panels are made up of corrugated flutes. In some such embodiments, the corrugated flutes and panels may be configured such that, after assembly into a container, one or more (in some cases, all) of the side locking tabs (e.g., locking tab 138 in sheet/container 100 and locking tab 638 in sheet/container 600) have corrugated flutes that are angled with respect to (in some cases at least substantially perpendicular to) the corrugated flutes of the panel within which their respective slots have been formed (e.g., slot 142 in panel 140 with respect to sheet/container 100 and slot 642 in panel 640 with respect to sheet/container 600). This may provide for additional rigidity and flexibility for repeated assembly and disassembly. If the flutes of these side locking tabs were instead orientated in the same direction as the panels of their corresponding slots, the side locking tabs may be more prone to bending between the flutes, which could cause the container to be less sturdy.

It will be understood by those having skill in the art that changes may be made to the details of the above-described embodiments without departing from the underlying principles presented herein. In addition, any suitable combination of various embodiments, or the features thereof, is contemplated.

Any methods disclosed herein may comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment.

Those having skill in the art will therefore appreciate that many changes may be made to the details of the above-described embodiments without departing from the underlying principles of the invention. The scope of the present invention should, therefore, be determined only by the following claims.

The invention claimed is:

1. A sheet for folding into a container, comprising:
a first panel comprising a first locking tab;
a second panel configured to be folded with respect to the first panel during a folding process for folding the sheet into a three-dimensional container;
a first locking flap positioned on the second panel, wherein the first locking flap comprises a slot configured to receive the first locking tab to secure the first panel and the second panel in place to at least partially define the three-dimensional container after the folding process, wherein the first locking flap comprises a door, wherein the door is configured to open to expose the slot for receiving the first locking tab upon bending the first locking flap with respect to the second panel, and wherein the sheet is configured such that, upon folding the second panel with respect to the first panel during the folding process, the first locking tab automatically engages the door to cause the first locking flap to bend and expose the slot.

2. The sheet of claim 1, further comprising a third panel configured to be folded with respect to the first panel and the second panel during the folding process, wherein the third panel comprises a second locking tab.

3. The sheet of claim 2, wherein the second locking tab is configured to be positioned adjacent to the first locking tab after at least one folding step in which the third panel is folded relative to the first panel.

4. The sheet of claim 1, wherein the first panel further comprises a rollover flap.

5. The sheet of claim 4, wherein the rollover flap further comprises a clearance aperture.

6. The sheet of claim 5, wherein the first locking tab is positioned within the clearance aperture such that the clearance aperture provides spacing between the first locking tab and a peripheral portion of the first panel.

7. The sheet of claim 6, wherein the clearance aperture extends about a periphery of the first locking tab other than along a base portion of the first locking tab at which the first locking tab is coupled with the first panel.

8. A sheet for folding into a container, comprising:
a first panel comprising:
a rollover flap comprising a clearance aperture;
a first locking tab positioned within the clearance aperture such that the clearance aperture provides spacing between the first locking tab and the rollover flap, wherein the clearance aperture extends about a periphery of the first locking tab other than along a base portion of the first locking tab at which the first locking tab is coupled with the first panel; and
a second panel, wherein the rollover flap is configured to be folded over against the first panel to expose the first locking tab.

9. The sheet of claim 8, further comprising a second locking tab positioned on the rollover flap, wherein the second locking tab extends beyond a peripheral edge of the first panel.

10. The sheet of claim 9, wherein the second panel comprises a slot for receiving the second locking tab.

11. The sheet of claim 10, wherein the second locking tab is configured to be received in the slot after the rollover flap is folded over against the first panel to expose the first locking tab.

12. A container, comprising:
a first side panel comprising a first locking tab and a rollover flap, wherein the rollover flap is configured to be folded with respect to the first side panel to expose the first locking tab, wherein the first side panel further comprises a clearance aperture, and wherein the first locking tab is positioned to extend within the clearance aperture such that the clearance aperture provides spacing between the first locking tab and the rollover flap, wherein the first side panel further comprises a second locking tab, wherein the second locking tab extends beyond a peripheral edge of the first side panel at least substantially perpendicular to the first locking tab; and
a first top panel comprising a slot for receiving the first locking tab, wherein the first top panel further comprises a first locking flap configured to extend adjacent to an exterior surface of the container at least substantially parallel to the first locking tab to secure the first top panel in a closed position to at least partially enclose the container.

13. The container of claim 12, further comprising a second side panel positioned adjacent and at least substantially parallel to the first side panel.

14. The container of claim 13, wherein the second side panel comprises a second locking tab.

15. The container of claim 14, wherein the slot is configured to receive the first locking tab and the second locking tab.

16. The container of claim 15, wherein the slot is configured to receive the first locking tab and the second locking tab with the first locking tab adjacent to and at least substantially parallel to the second locking tab.

17. The container of claim 16, wherein the first locking flap is configured to extend adjacent to the exterior surface of the container at least substantially parallel to the first locking tab and the second locking tab to secure the first top panel in a closed position to at least partially enclose the container.

18. The container of claim 12, wherein the second locking tab is positioned on the rollover flap.

19. The container of claim 12, wherein the clearance aperture extends adjacent to a portion of the first locking tab opposite from a base portion of the first locking tab at which the first locking tab is coupled with the first side panel and adjacent to at least one side of the first locking tab extending at least substantially perpendicular to the base portion.

20. The container of claim 19, wherein the clearance aperture extends adjacent to an entire periphery of the first locking tab other than along the base portion.

\* \* \* \* \*